(12) United States Patent
Kim et al.

(10) Patent No.: US 7,330,650 B2
(45) Date of Patent: Feb. 12, 2008

(54) BI-DIRECTIONAL WAVELENGTH DIVISION MULTIPLEXING SELF-HEALING OPTICAL RING NETWORK

(75) Inventors: Jong-Kwon Kim, Taejonkwangyok-shi (KR); Ki-Cheol Lee, Suwon-shi (KR); Jun-Ho Koh, Suwon-shi (KR)

(73) Assignee: Samsung Electronics Co., Ltd., Maetan-Dong, Yeongtong-Gu, Suwon-si, Gyeonggi-Do (KR)

( * ) Notice: Subject to any disclaimer, the term of this patent is extended or adjusted under 35 U.S.C. 154(b) by 584 days.

(21) Appl. No.: 10/781,037

(22) Filed: Feb. 18, 2004

(65) Prior Publication Data
US 2004/0218526 A1 Nov. 4, 2004

(30) Foreign Application Priority Data
Apr. 30, 2003 (KR) .................. 10-2003-0027671

(51) Int. Cl.
H04J 14/02 (2006.01)
(52) U.S. Cl. ............................. 398/4; 398/83
(58) Field of Classification Search ............... 398/3–4, 398/59, 83–85, 137
See application file for complete search history.

(56) References Cited

U.S. PATENT DOCUMENTS

| | | | |
|---|---|---|---|
| 6,222,653 B1 | 4/2001 | Asahi | 359/110 |
| 6,243,512 B1 | 6/2001 | Rettenberger et al. | 385/24 |
| 6,278,536 B1 | 8/2001 | Kai et al. | 359/127 |
| 7,133,609 B2 * | 11/2006 | Kim et al. | 398/3 |
| 2004/0131354 A1 * | 7/2004 | Kim et al. | 398/3 |

FOREIGN PATENT DOCUMENTS

| | | |
|---|---|---|
| EP | 0729248 A2 | 2/1996 |
| JP | 11-346189 | 12/1999 |
| JP | 2001-044936 | 2/2001 |
| WO | WO 00/35105 | 6/2000 |

OTHER PUBLICATIONS

Y. Joo et al.; "Single Fiber Bidirectional Self-Healing Ring by Sharing Amplifier and DCF;" Optical Society of America/IEEE; Mar. 23-28, 2003; XP010680182; 3 pgs.

* cited by examiner

*Primary Examiner*—Leslie Pascal
(74) *Attorney, Agent, or Firm*—Cha & Reiter, LLC (57) ABSTRACT

A bi-directional wavelength division multiplexing self-healing optical ring network is disclosed, in which N optical signals are processed at both first and second ring network so that a protection switch mechanism is performed when a link failure occurs in any one of the first and second ring networks. The bi-directional WDM self-healing optical ring network includes a plurality of nodes having optical add/drop multiplexers, each being provided on the first and second ring networks and further including a demultiplexer and a multiplexer, each of which has a capacity of 1×N; a pair of switching devices provided across the first and second ring networks and connected between the optical add/drop multiplexers and fiber optic links connected with another node; and, wavelength interleavers, each being provided on both ends of each optical add/drop multiplexer provided on the first and second ring networks, includes three ports, of which one port is connected to each switching device and allows for passing signals of all wavelength bands, another port allows for passing only signals of some wavelength bands processed on any one of the first and second ring networks, and the third port allows for passing only signals of the other wavelength bands processed on the other.

9 Claims, 10 Drawing Sheets

BI-DIRECTIONAL WAVELENGTH DIVISION MULTIPLEXING SELF-HEALING OPTICAL RING NETWORK

CLAIM OF PRIORITY

This application claims priority to an application entitled "Bi-Directional Wavelength Division Multiplexing Self-Healing Optical Ring Network," filed in the Korean Intellectual Property Office on Apr. 30, 2003 and assigned Serial No. 2003-27671, the contents of which are hereby incorporated by reference.

BACKGROUND OF THE INVENTION

1. Field of the Invention

The present invention relates to an optical ring network based on a wavelength division multiplexing (WDM) technology, and more particularly to an optical ring network capable of transmitting optical signals in a two-way direction and performing self-healing, and its related method of providing an efficient recovery switching of transmission signals when a link failure occurs.

2. Description of the Related Art

With the commercialization of wavelength division multiplexing (WDM) technology for transmitting multiple signals with different wavelengths through a single optical fiber, it is possible to send a plurality of high-capacity optical signals at a very high speed. Further development in techniques in routing, switching, and dropping/adding of optical signals now allow designers and engineers to build an optical network based on the WDM technology.

The WDM optical networks may be generalized into a ring network based on an optical add/drop multiplexer and a mesh network based on optical line distributor. Both of these optical networks require an efficient scheme to cope with a link failure. In the mesh network, a protective switching against such a failure is slow but not complicated as each node is connected to a plurality of optical fibers. In the ring network, it is easier since the optical add/drop multiplexer constituting a node is connected with two or four optical fibers. For this reason, the ring network is more preferred and widely used.

In the WDM optical ring network, each node may include at least one optical add/drop multiplexer for dropping or adding optical signals and at least one switching device for performing a protective switching of signals. According to a protective switch technique, the ring networks may be classified into networks based on a path protection switch scheme and a link protection switch scheme. Further, the ring networks may utilize two or four optical fibers depending on the number of input/output optical fibers, and are classified into a unidirectional transmission and a bi-directional transmission depending on the data transmission direction.

Figure 1:
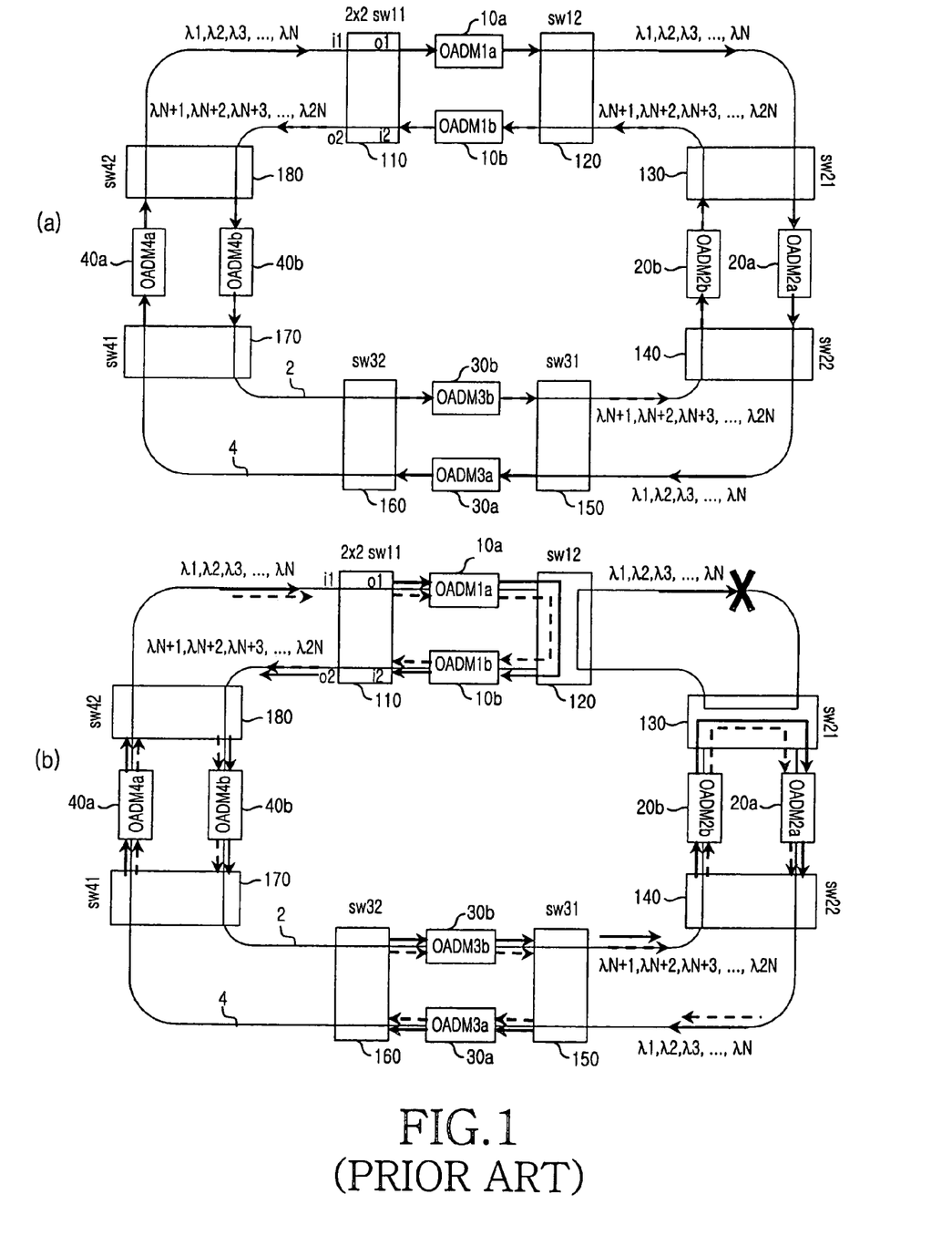
FIG. 1 shows a configuration illustrating a protection switch technique of the bi-directional optical network using the conventional link protection switching technique.

FIG. 1 shows a configuration illustrating the protection switching technique of a bi-directional optical network according to the conventional technique. As shown in FIG. 1, each node of the ring network comprises a plurality of optical add/drop multiplexers 10a to 40a; and 10b to 40b, each of which adds or drops individual optical signals, and a plurality of 2×2 optical switching devices 110 to 180, each of which performs the switching of signals through inner and outer rings. In the outer ring network 4, optical signals with wavelengths of λ1, λ2, λ3, ..., λN are transmitted. In the inner ring network 2, optical signals with wavelengths of λN+1, λN+2, λN+3, ..., λ2N are transmitted. In this case, the outer ring network 4 is for a clockwise transmission, while the inner ring network 2 is for a counter-clockwise transmission.

When a link failure occurs, the optical network performs the protection switching by transmitting the optical signals in the looped-back or inverse direction using two of the 2×2 optical switching devices, which are arranged on both ends oft he failed link. For example, referring to FIG. 1(b), when the failure occurs at the outer fiber optic link connecting between the first outer optical add/drop multiplexer OADM1a or 10a and the second outer optical add/drop multiplexer OADM2a or 20a, optical signals with wavelengths of λ1, λ2, λ3, ..., λN, which are sent from the first outer optical add/drop multiplexer OADM1a or 10a to the second outer optical add/drop multiplexer OADM2a or 20a, are looped-back to the first inner optical add/drop multiplexer OADM1b or 10b through the second-right optical switching device sw12 or 120, and then transmitted in the counter-clockwise direction through the inner ring network 2. The optical signals with wavelengths of λ1, λ2, λ3, ..., λN, which are sent through the inner ring network 2 are transmitted from the second inner optical add/drop multiplexer OADM2b or 20b to the second outer optical add/drop multiplexer OADM2a or 20a through the second-left optical switching device sw21 or 130, and thus completing the protection switch switching.

When the ring network is operated normally, the 2×2 optical switching devices 110 to 180 maintain a bar state or no cross state, so that signals applied to the outer left input port i1 are transferred to the outer right output port o1, and the signals applied to the inner right input port i2 are transferred to the inner left output port o2. However, when a link failure occurs, the optical switching devices 110 to 180 maintain a cross state, so that signals applied to the outer left input port i1 are transferred to the inner left output port o2, while signals applied to the inner right input port i2 are transferred to the outer right output port o1. In FIG. 1(b), the second left optical switching device sw21 or 130 is maintained in the cross state. Thus, the optical signals passing through the failed link are looped-back together with the optical signals with wavelengths of λN+1, λN+2, λN+3, ..., λ2N, which are sent in a counter-clockwise direction from the second inner optical add/drop multiplexer OADM2b or 20b to the first inner optical add/drop multiplexer OADM1b or 10b. Then, the looped-back optical signals are transmitted in the clockwise direction through the outer ring network 4, and subsequently transferred from the first outer optical add/drop multiplexer OADM1a or 10a to the first inner optical add/drop multiplexer OADM1b or 10b through the first-right optical switching device sw12 or 120. Meanwhile, other optical switching devices of the nodes which are not adjacent to the failed link continue to maintain the bar state without any change.

In the above-described conventional method, there are drawbacks when the bi-directional self-healing optical ring networks are put into practice with two optical fibers. First, when the channel interval of the transmission optical signals becomes narrow, signals are subjected to a deterioration caused by a non-linear property of the optical fiber. Second, because the prior art does perform multiplexing and demultiplexing of the loop-back signals and existing transmission signals simultaneously so as to perform the protection switch when the failure occurs, the multiplexer/demultiplexer must have twice the processing capacity necessary to perform the actual transmission.

Figure 2:
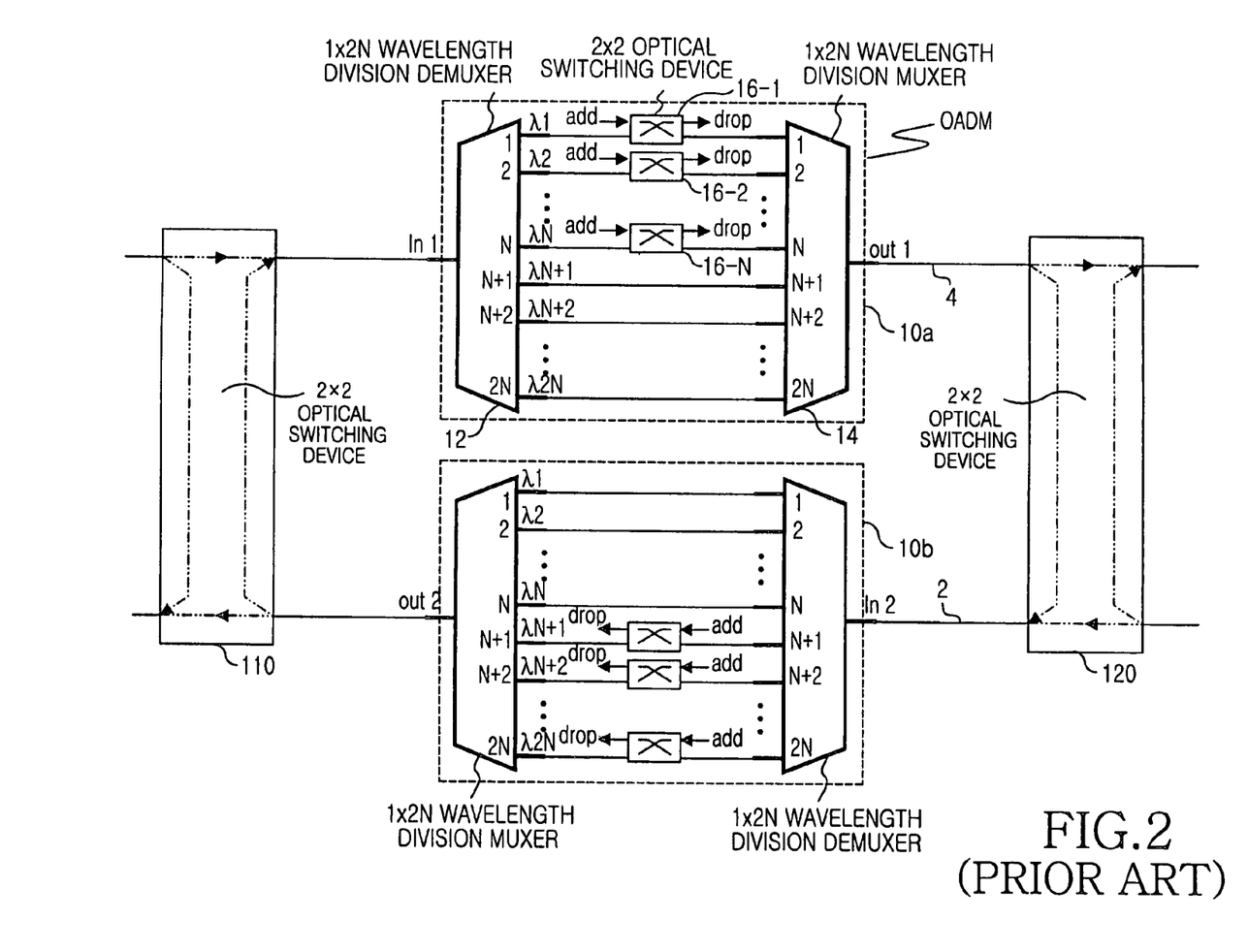
FIG. 2 shows a structure of the conventional optical line distributor.

FIG. 2 shows a structure of the conventional optical line distributor. It is assumed that an outer optical add/drop multiplexer is operated as one component in each node of the outer ring network 4, and an inner optical add/drop multiplexer is operated as one component in each node of the inner ring network 2. Therefore, each wavelength processed on the outer ring is λ1, λ2, λ3, . . . , λN, while one processed on the inner ring is λN+1, λN+2, λN+3, . . . , λ2N. However, with the outer optical add/drop multiplexer 10a, either a multiplexer 14 or a demultiplexer 12 must have a capacity in consideration of the looped-back transmission signals, so that signals with wavelengths of λN+1, λN+2, λN+3, . . . , λ2N can be multiplexed or demultiplexed while passing through the multiplexer 14 or the demultiplexer 12. Similarly, with the inner optical add/drop multiplexer 10b, signals with wavelengths of λ1, λ2, λ3, . . . , λN must be subjected to multiplexing and demultiplexing. As such, the multiplexer and demultiplexer of the optical add/drop multiplexer for transmitting N optical signals must each have a capacity of 1×2N.

Another drawback is that signals not related to the link failure are also looped-back together. Referring back to FIG. 1, optical signals with wavelengths of λN+1, λN+2, λN+3, . . . , λ2N which travel the normal link of the inner ring network 2 are looped-back when the link failure occurs, and then transmitted along the outer ring network 4 in the clockwise direction. Accordingly, there occurs a problem in that interruption of transmission signals as well as loss of data is incurred.

SUMMARY OF THE INVENTION

The present invention has been made to solve the above-mentioned problems occurring in the prior art and provides additional advantages, by providing a bi-directional WDM self-healing optical ring network, which is economical and efficient in a way that a mutiplexer and a demultiplexer of an optical add/drop multiplexer have a capacity decreased by one-half as much as that of the prior art. Further, if the optical signals are directly transmitted without any loop-back when a link failure occurs.

In one embodiment, a bi-directional WDM self-healing optical ring network is provided, in which N optical signals are processed on both first and second ring networks. When a link failure occurs on any one of the first and second ring networks, a protection switching is performed using the other ring network. In the embodiment, the bi-directional WDM self-healing optical ring network includes a plurality of nodes having optical add/drop multiplexers, each being provided on the first and second ring networks and includes a demultiplexer and a multiplexer, each of which has a capacity of 1×N; a pair of switching devices provided across the first and second ring networks and connected between the optical add/drop multiplexers and fiber optic links connected with another node; and, wavelength interleavers, each being provided on both ends of each optical add/drop multiplexer provided on the first and second ring networks. The interleaver further includes three ports, of which one port is connected to each switching device and allows for passing signals of all wavelength bands, another port allows for passing only signals of some wavelength bands processed on any one of the first and second ring networks, and the third port allows for passing only signals of the other wavelength bands processed on the other.

BRIEF DESCRIPTION OF THE DRAWINGS

The above features and advantages of the present invention will be more apparent from the following detailed description taken in conjunction with the accompanying drawings, in which:

FIG. 5 shows operation of one of a plurality of interleavers applied to the present invention;

DETAILED DESCRIPTION OF THE PREFERRED EMBODIMENT

Hereinafter, a preferred embodiment of the present invention will be described in detail with reference to the accompanying drawings. For the purposes of clarity and simplicity, a detailed description of known functions and configurations incorporated herein will be omitted as it may make the subject matter of the present invention unclear.

According to the teachings of the present invention, a non-linearity during the transmission of optical signals is minimized in an optical fiber by means of a double increasing a channel interval when compared with the conventional technique. In addition, even though a loop-back technique is used to perform a protection switching in a bi-directional self-healing optical ring network, only one wavelength interleaver may be required in an optical add/drop multiplexer in order to decrease the capacities of a multiplexer and a demultiplxer by half as much as those required in the conventional optical add/drop multiplexer. Further, the optical ring network according to the present invention is configured so that optical signals traveling in the path of a failed link can be transmitted normally without any loop-back.

Figure 3:
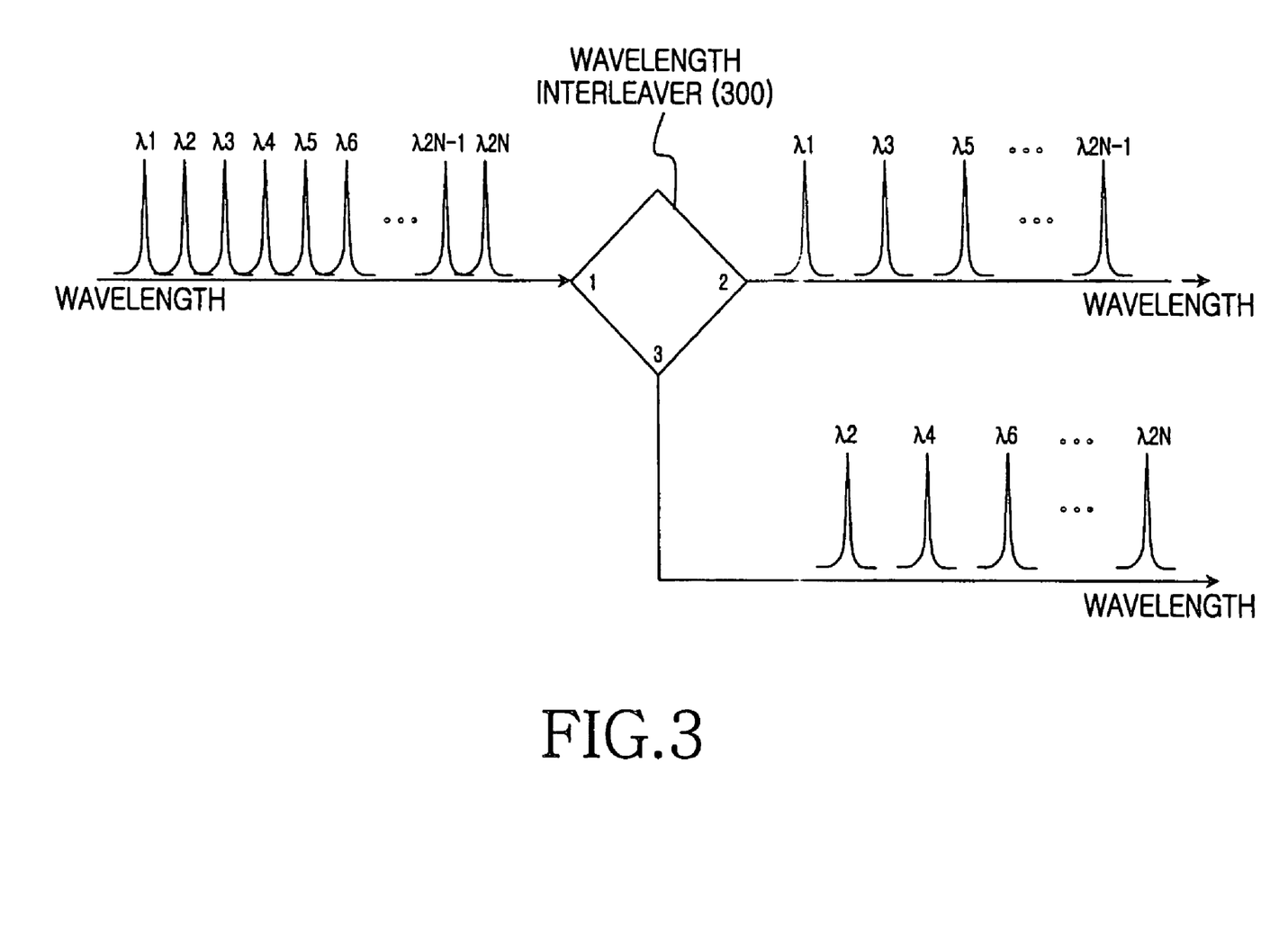
FIG. 3 shows an operation of one wavelength interleaver employed according to the present invention.

FIG. 3 shows an operation of one wavelength interleaver deployed in an optical network according to the embodiment of the present invention. As shown, the wavelength interleaver 300 is a passive device and has three ports, that is, a port 1, a port 2 and a port 3, so that when signals passing through the port 1 have wavelengths of λ1, λ2, λ3, . . . , λN; and λN+1, λN+2, λN+3, . . . , λ2N (where, N is the even number), signals passing through the port 2 become odd-numbered channels with wavelengths of λ1, λ3, λ5, . . . , λN−1; and λN+1, λN+3, λN+5, . . . , λ2N−1 (hereinafter, used as λ1, λ3, . . . , λ2N−1), and sign the port 3 become even-numbered channels with wavelengths of λ2, λ4, λ6, . . . , λN; and λN+2, λN+4, λN+6, . . . , λ2N (hereinafter, used as λ2, λ4, . . . , λ2N).

Figure 4:
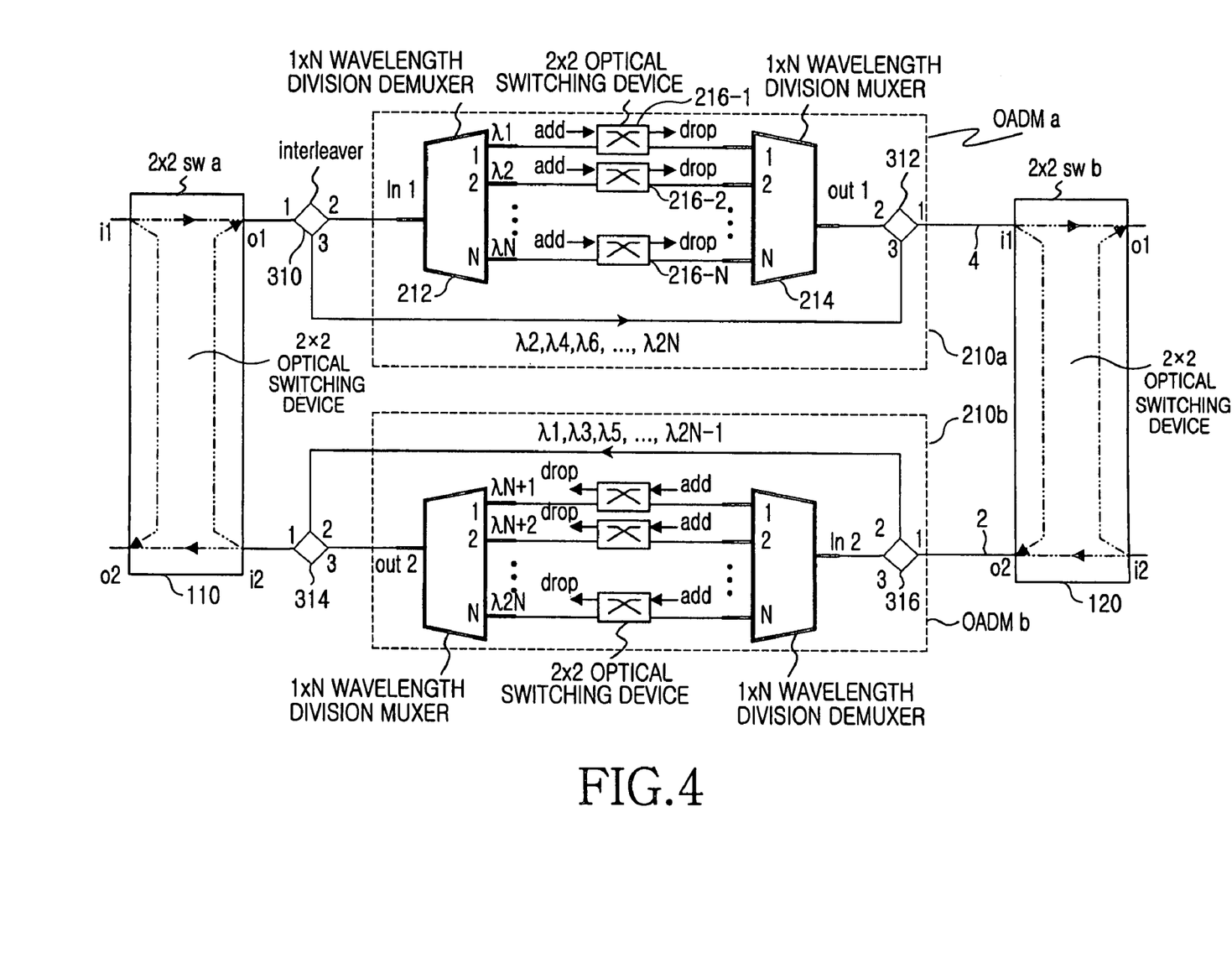
FIG. 4 shows a construction combining of optical add/drop multiplexers and 2×2 optical switching devices in accordance to a first embodiment of the present invention.

FIG. 4 shows the construction of combining optical add/drop multiplexers and 2×2 optical switching devices in accordance to a first embodiment of the present invention.

Figure 5:
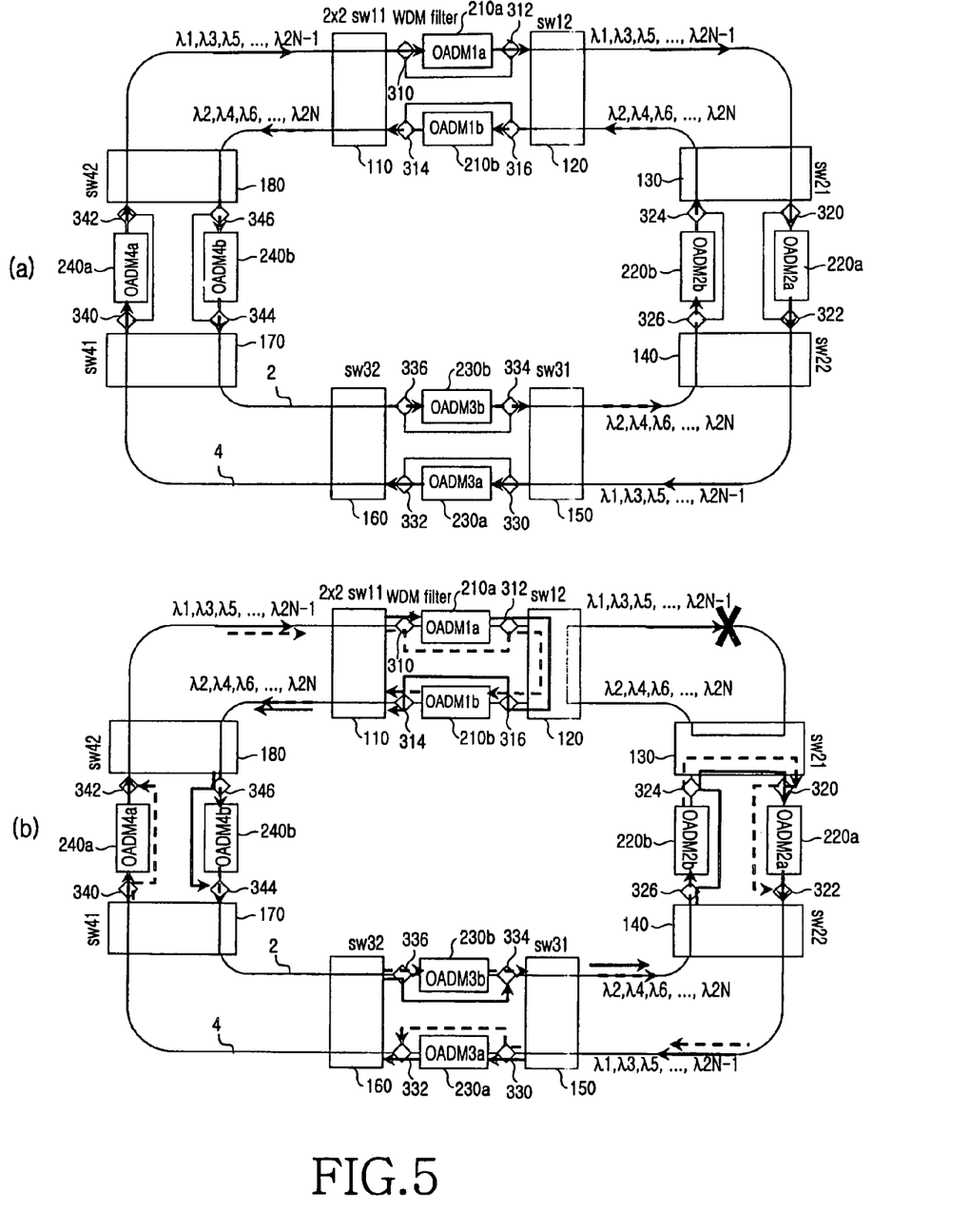
FIG. 5 shows a construction of an optical ring network employing optical add/drop multiplexers and 2×2 optical switching devices of the present invention.

FIG. 5 shows the operation process of an optical ring network employing the optical add/drop multiplexers and 2×2 optical switching devices shown in FIG. 4. In particular, FIG. 5(a) shows the case of a normal operation without a transmission link failure, whereas FIG. 5(b) shows a scenario when such a failure occurs in a fiber optic transmission link, which connects between the optical add/drop multiplexers OADM1a and OADM1b in the optical ring network of FIG. 5(a).

Referring to FIGS. 4 and 5, each node of outer and inner ring networks 4 and 2 according to the first embodiment of the present invention includes optical add/drop multiplexers (i.e., 210a and 210b), each of which drops or adds optical signals. As shown in FIG. 4, each of the optical add/drop multiplexers 210a and 210b includes a 1×N demultiplexer 212, an N×1 multiplexer 214, and N 2×2 optical switches 216-1, 216-2, ..., 216-N. The 2×2 optical switching devices 110 and 120 are connected at both ends of the optical add/drop multiplexers 210a and 210b, and across the outer and inner ring networks 4 and 2. The outer ring network 4 is used to perform the protection switching by providing a detour or a bypass route with the provision of a loop-back process when a failure occurs at the fiber optic link of the inner ring network 2. In other words, the outer ring network 4 functions not only serve as a path for the normal operation, but also as a path for performing the protection switching against a failure in the inner ring network 2. Similarly, the same operation is performed by the inner ring network 2 for the outer ring network 4.

In operation, the outer ring network 4 transmits the odd-numbered optical signals, which have wavelengths of $\lambda 1, \lambda 3, \ldots, \lambda 2N-1$, while the inner ring network 2 processes the even-numbered optical signals, which have wavelengths of $\lambda 2, \lambda 4, \ldots, \lambda 2N$. Here, the outer ring network 4 transmits the odd-numbered optical signals in a clockwise direction, while the inner ring network 2 transmits the even-numbered optical signals in a counter-clockwise direction. To this end any optical add/drop multiplexer O ADMa (e.g., 210a) provided in each node of the outer ring network 4 functions to drop and add the odd-numbered signals with the wavelengths of $\lambda 1, \lambda 3, \ldots, \lambda 2N-1$ in the clockwise (right-handed) direction, and any optical add/drop multiplexer OADMb (e.g., 210b) provided in each node of the inner ring network 2 functions to drop and add the even-numbered signals with the wavelengths of $\lambda 2, \lambda 4, \ldots, \lambda 2N$ in the counter-clockwise (left-handed) direction.

In the present invention, if a channel interval would be $\Delta\lambda$ (where, $\Delta\lambda=\lambda 2-\lambda 1$) in the conventional optical communication network, then the channel interval according to the present invention would be $2\Delta\lambda$ (where, $2\Delta\lambda=\lambda 3-\lambda 1$). Note that if there are channels $\lambda 1$ and $\lambda 2$ and an interval of the channels is $\Delta\lambda$, an influence of $\lambda 2$ on $\lambda 1$ is a function of $\Delta\lambda$. Also, the function of $\Delta\lambda$ are cross phase modulation (XPM), dispersion, and so forth. Further, there is a crosstalk by a filter. All these factors are determined by spacing. Accordingly, by increasing the channel interval of the optical signal transmissions, the present invention can minimize the influence of phase intermodulation or the influence by an adjacent channel, such as an influence of crosstalk based on a transmission characteristic of a filter, all of which may be generated during WDM optical transmission.

Referring back to FIG. 5, the optical add/drop multiplexers 210a and 210b according to the first embodiment of the present invention are arranged as a pair at opposite ends, each pair of which are connected with the wavelength interleavers 310, 312; and 314, 316. The wavelength interleavers 310, 312; and 314, 316 are passive devices for performing both the multiplexing or demultiplexing of the wavelength bands of $\lambda 1, \lambda 3, \ldots, \lambda 2N-1$ and $\lambda 2, \lambda 4, \ldots, \lambda 2N$. Each of the wavelength interleavers 310, 312; and 314, 316 has a port 1 through which all wavelength bands can pass, a port 2 through which only signals of the wavelength bands of $\lambda 1, \lambda 3, \ldots, \lambda 2N-1$ can pass, and a port 3 through which only signals of the wavelength bands of $\lambda 2, \lambda 4, \ldots, \lambda 2N$ can pass. Of three ports of each wavelength interleaver 310, 312, 314, or 316, one port is connected to the respective optical switching devices 110 and 120, and another port is connected to one end of the respective optical add/drop multiplexers 210a and 210b. A third port is connected to the same port of the different wavelength interleaver 310, 312, 314 or 316 within each node of the corresponding ring network 2 or 4. For example, with reference to the wavelength interleaver 310, the first port 1 is connected to the optical switching device 110, the second port 2 is connected to one end of the optical add/drop multiplexer 210a, and the third port 3 is connected to the third port 3 of the corresponding different wavelength interleaver 312, which is provided within the node of the outer ring network 4.

When the bi-directional optical ring network of the present invention is operated normally without a failure, optical signals with the wavelengths of $\lambda 1, \lambda 3, \ldots, \lambda 2N-1$ are inputted into the optical add/drop multiplexer 210a of the outer ring network 4, while optical signals with the wavelengths of $\lambda 2, \lambda 4, \ldots, \lambda 2N$ are inputted into the optical add/drop multiplexer 210b of the inner ring network 2. When the outer and inner ring networks are operated normally, the 2×2 optical switching device maintains a bar or no-cross state, so that signals applied to an outer-left input port i1 are propagated to an outer-right output port o1, and signals applied to an inner-right input port i2 are propagated to an inner-left output port o2. At the same time the optical switching device 110 is in the bar state, so that signals with the wavelengths of $\lambda 1, \lambda 3, \ldots, \lambda 2N-1$, which are applied to an outer-left input port i1 are propagated to the outer-right output port o1, and then outputted to the wavelength interleaver 310.

When the signals with the wavelengths of $\lambda 1, \lambda 3, \ldots, \lambda 2N-1$ are inputted through the optical switching device 110 into the port 1 of the wavelength interleaver 310, the signals are transferred to the optical add/drop multiplexer 210a via only the port 2, through which only the signals with the wavelength bands of $\lambda 1, \lambda 3, \ldots, \lambda 2N-1$ are allowed to pass. Since the input port of the optical add/drop multiplexer 210a is connected to the port 2 of the wavelength interleaver 310, the optical add/drop multiplexer 210a receives only the signals with wavelength bands of $\lambda 1, \lambda 3, \ldots, \lambda 2N-1$. The optical signals outputted from the optical add/drop multiplexer 210a are inputted into the port 2 of the wavelength interleaver 312. The optical signals with the wavelengths of $\lambda 1, \lambda 3, \ldots, \lambda 2N-1$, which are inputted into the port 2 of the wavelength interleaver 312, are transferred to the optical switching device 120 via the port 1 of the wavelength interleaver 312, and then proceed to next optical switching device 130.

However, as shown in FIG. 5(b), when a link failure occurs in the fiber optic link, for example when a failure occurs at the fiber optic link between the optical switching device 120 and the optical switching device 130 in the outer ring network 4, the optical signals with the wavelength bands of $\lambda 1, \lambda 3, \ldots, \lambda 2N-1$, which are transferred to the optical add/drop multiplexer 210a of the outer ring network 4, do no longer proceed past the optical switching device 120 toward the optical switching device 130. At this time, both of the optical switching devices 120 and 130 arranged at the opposite ends of the failed link are changed to maintain a cross state by a predetermined control signal (not shown), so that signals applied to the outer-left input port i1 are transferred to the inner-left output port o2, and signals applied to the inner-right input port i2 are transferred to the outer-right output port o1. The optical signals transferred to the outer-left port i1 of the optical switching device 120 are outputted to the inner-left output port o2 by setting the optical switching device 120 to the cross state under the control of a predetermined control signal (not shown), and then looped-back to the port 1 of the wavelength interleaver 316, which is connected to the inner-left output port o2 of the optical switching device 120.

The optical signals of $\lambda 1, \lambda 3, \ldots, \lambda 2N-1$, which are inputted to the wavelength interleaver 316 by the optical switching device 120, are transferred to corresponding wavelength interleaver 314 directly without passing through the optical add/drop multiplexer 210b. Thus, each optical add/drop multiplexer according to the present invention multiplexes or demultiplexes only signals which it must drop or add. That is, the optical add/drop multiplexer 210b processes only the optical signals with wavelengths of $\lambda 1, \lambda 3, \ldots, \lambda 2N-1$. To be specific, when the optical signals of $\lambda 1, \lambda 3, \ldots, \lambda 2N-1$ are inputted into the port 1 of the wavelength interleaver 316, the optical signals are transferred to the wavelength interleaver 314 through the port 2 of the wavelength interleaver 316, through which the optical signals with the wavelength band pass. The looped-back optical signals with wavelengths of $\lambda 1, \lambda 3, \ldots, \lambda 2N-1$ are demultiplexed at the port 2 of the wavelength interleaver 314, and then multiplexed again at port 1 of the wavelength interleaver 314, and finally transferred to a neighboring node together with the optical signals with wavelengths of $\lambda 2, \lambda 4, \ldots, \lambda 2N$.

Ina node that is not adjacent to the failed link, the optical switching device also maintains the bar state as in the normal operation. As shown in FIG. 5, the signals which are looped-back and then return are connected through adjacent wavelength interleavers directly, so that the capacity of 1×N will be adequate for each multiplexer and demultiplexer of the optical add/drop multiplexer. As a result, according to the present invention, each of the multiplexer and demultiplexer has the capacity of 1×N, which reduces half the capacity of 1×2N that was necessary in the prior art.

Figure 6:
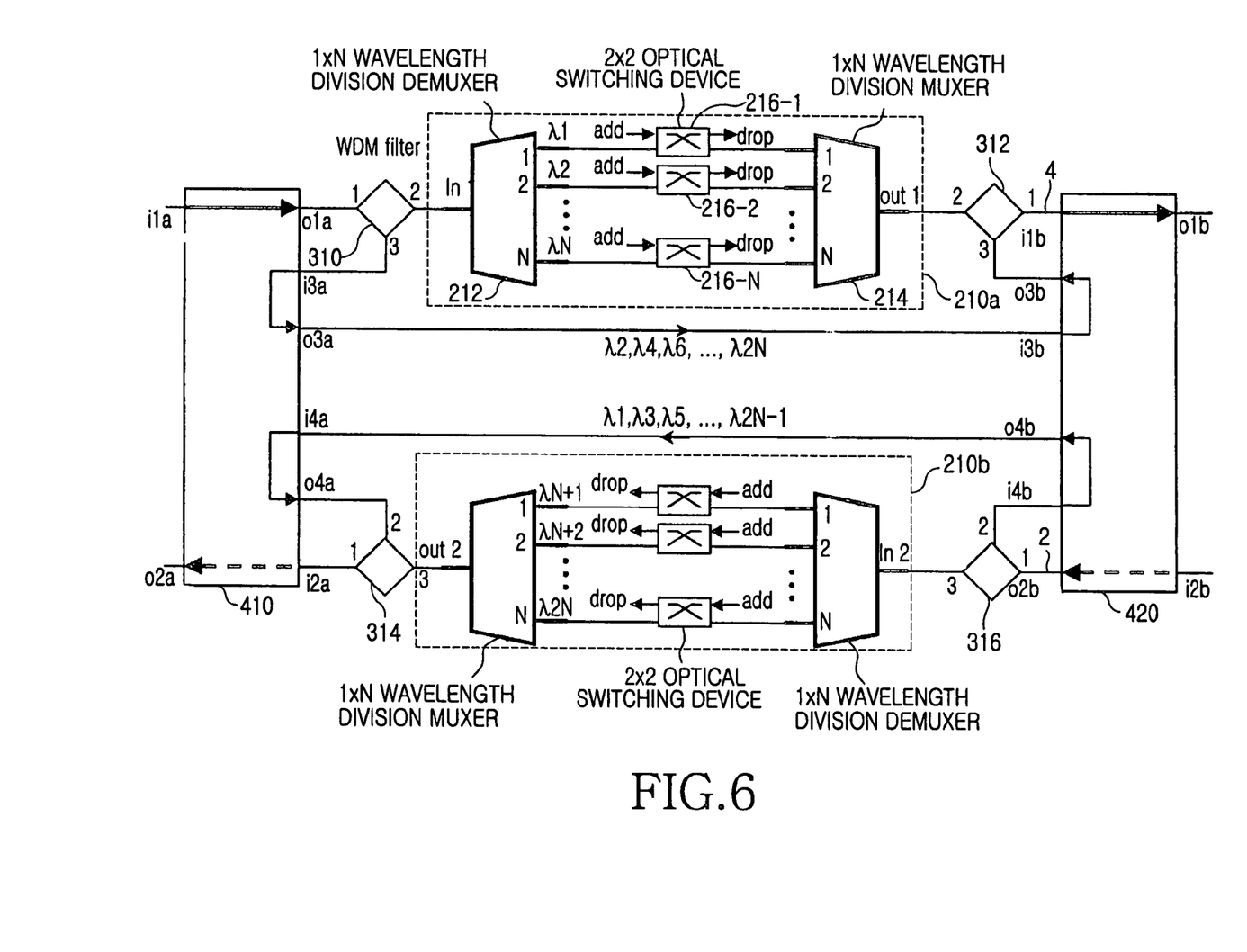
FIG. 6 shows a construction combining optical add/drop multiplexers and 4×4 optical switching devices in accordance to a second embodiment of the present invention.
Figure 7:
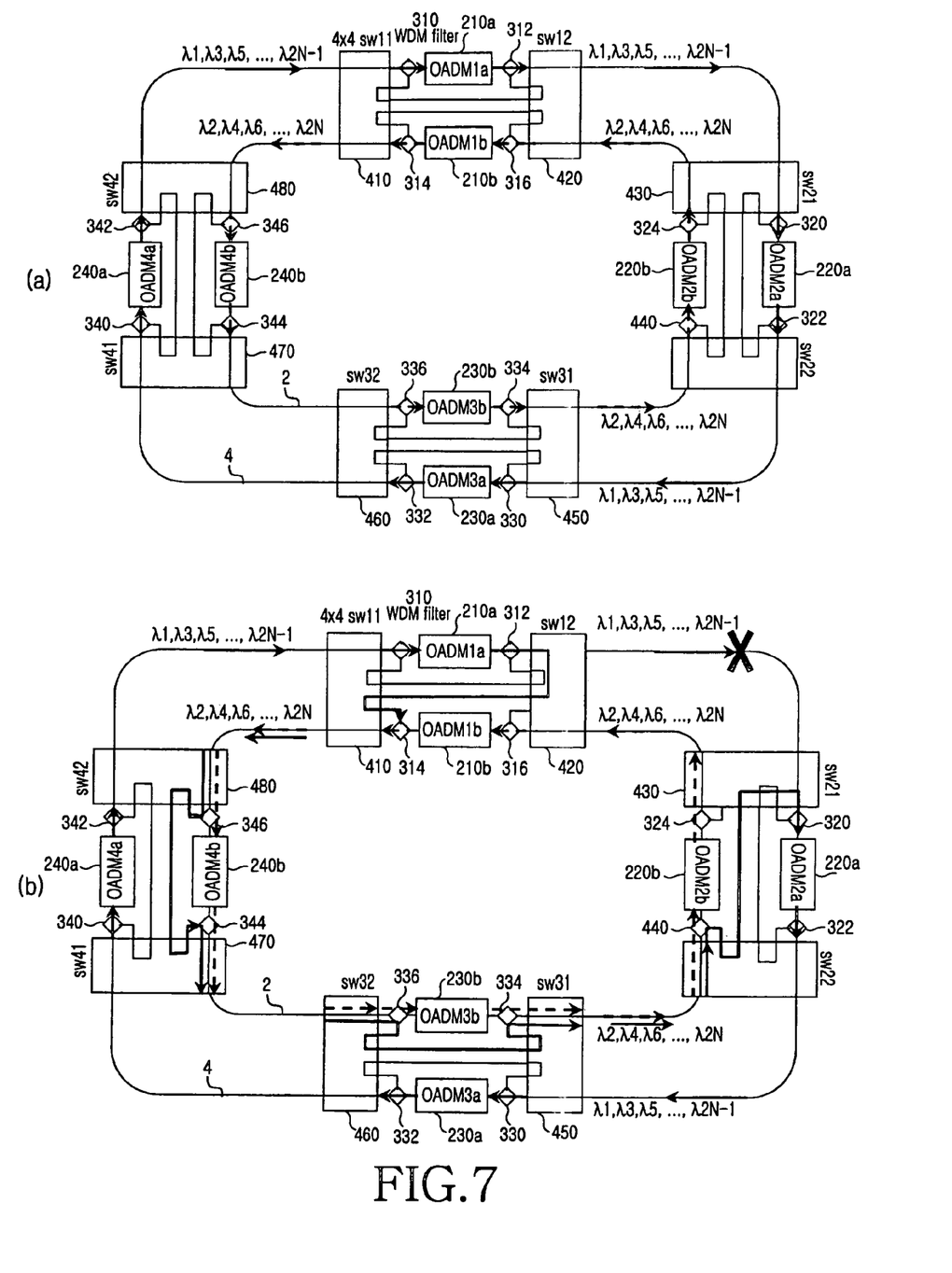
FIG. 7 shows a construction of an optical ring network employing optical add/drop multiplexers and 4×4 optical switching devices of the present invention.

FIG. 6 shows the construction of combining optical add/drop multiplexers and 4×4 optical switching devices in accordance to a second embodiment of the present invention. FIG. 7 shows the construction of an optical ring network employing optical add/drop multiplexers and 4×4 optical switching devices shown in FIG. 6. In particular, FIG. 7(a) shows the case in which a bi-directional optical ring network is operated normally without a failure, and FIG. 7(b) shows the case in which a link failure occurs in the fiber optic transmission link, which connects between the optical add/drop multiplexers OADM1a and OADM1b of the optical ring network shown in FIG. 7(a).

Referring to FIGS. 6 and 7(a), in the optical ring network employing the optical add/drop multiplexers 210a to 240a; and 210b to 240b and optical switching devices 410 to 480, the looped-back signals are connected using the wavelength interleavers without performing the multiplexing and demultiplexing at the optical add/drop multiplexers 210a to 240a; and 210b to 240b. Note that this is similar to the first embodiment of the present invention, except that the 4×4 optical switching devices 410 and 480 are designed to make it possible to separately switch only the signals, which are looped-back and then return. That is, the foregoing first embodiment of the present invention is constructed to loop-back not only the optical signals passing through the link at which a failure occurs, but also optical signals passing through the link at which no failure occurs using the 2×2 optical switching devices 210 to 280. In contrast, the second embodiment of the present invention is constructed to make it possible to separately switch only the signals which are looped-back due to such a failure, and thereby the signals passing through the link free path can be directly transmitted without being looped-back.

In the second embodiment, the 4×4 optical switching devices 410 to 480 are each additionally provided with the two pairs of input and output ports in such a way that an input port i3a and an input port i4a are connected to an output port o3a and an output port o4a respectively, so as to transmit only the looped-back signals through the wavelength interleavers when a link failure occurs. This construction is unlike that of the 2×2 optical switching devices of the first embodiment of the present invention. In other words, when a link failure occurs at any one of fiber optic links of the outer and inner ring networks, each of the 4×4 optical switching devices 410 to 480 separately include the input/output ports for looping-back the optical signals with the wavelength bands which are processed within the outer ring network, and the input/output ports for looping-back the optical signals with the wavelength bands which are processed within the inner ring network.

In case that the bi-directional ring network is operated normally without the link failure, the optical signals with the wavelengths of $\lambda 1, \lambda 3, \ldots, \lambda 2N-1$, which are applied to an outer left input port i1a of the 4×4 optical switching device 410, for instance, are transferred to an outer right output port o1a, then transferred to the wavelength interleaver 310, which is connected with the outer right output port o1a. The optical signals with the wavelength bands of $\lambda 1, \lambda 3, \ldots, \lambda 2N-1$ pass through the port 2 of the wavelength interleaver 310 and then demultiplexed. After passing through the wavelength interleaver 310, the optical signals with the wavelength bands of $\lambda 1, \lambda 3, \ldots, \lambda 2N-1$ are demultiplexed and dropped through a 1×N demultiplexer 212 of the optical add/drop multiplexer 210a according to each wavelength, and then multiplexed and added through an N×1 mutiplexer 214, and finally outputted to the wavelength interleaver 312. After passing through the wavelength interleaver 312, the optical signals with the wavelength bands of $\lambda 1, \lambda 3, \ldots, \lambda 2N-1$ are transferred from an outer left input port i1b of the 4×4 optical switching device 420 to an outer right output port o1b, and then are transferred to a neighboring node.

Similarly, the optical add/drop multiplexers 210b to 240b of the inner ring network 2 and the 4×4 optical switching devices 410 to 480 perform the same process with the respect to the optical signals with wavelengths of $\lambda 2, \lambda 4, \ldots, \lambda 2N$. For example, the optical signals with the wavelengths of $\lambda 2, \lambda 4, \ldots, \lambda 2N$, which are applied to an input port i2b of the 4×4 optical switching device 420, are transferred to an output port o2b, and then transferred to the wavelength interleaver 316, which is connected with the output port o2a. The optical signals with the wavelength bands of $\lambda 2, \lambda 4, \ldots, \lambda 2N$ pass through a port 3 of the wavelength interleaver 316 and then demultiplexed. After passing through the wavelength interleaver 316, the optical signals with the wavelength bands of $\lambda 2, \lambda 4, \ldots, \lambda 2N$ are demultiplexed and dropped through a 1×N demultiplexer of the optical add/drop multiplexer 210b according to each wavelength, and then multiplexed and added through an N×1 mutiplexer of the optical add/drop multiplexer 210b, and finally outputted to the wavelength interleaver 314.

After passing through the wavelength interleaver 314, the optical signals with the wavelength bands of λ2, λ4, ..., λ2N are transferred from an input port i2a of the 4×4 optical switching device 420 to the output port o2a, and then are transferred to a neighboring node.

In contrast, when a failure occurs in the fiber optic link, for example when a failure occurs at the fiber optic link between the optical switching devices 420 and 430 in the outer ring network 4 as shown in FIG. 7(b), the optical signals of wavelengths of λ1, λ3, ..., λ2N−1, which are transferred to the optical add/drop multiplexer 210a of the outer ring network 4 can not travel past the optical switching device 430. As the optical signals with the wavelength bands of λ1, λ3, ..., λ2N−1 can not be transferred in a clockwise direction, these signals are looped-back and transferred in the counter-clockwise direction through switching of the 4×4 optical switching device sw12 (or 420). However, the inner optical add/drop multiplexers OADM4b and OADM 3b. (or 240b and 230b) are maintained the same without changing any connection of the optical switching devices as they are not adjacent to the failed link.

Accordingly, the optical signals which are looped-back and transferred are connected through the wavelength interleavers without multiplexing and demultiplexing at the optical add/drop multiplexers. The 4×4 optical switching device sw21 (or 430), which is located on one end of the failed link, is switched in a way that only the optical signals with the wavelengths of λ1, λ3, ..., λ2N−1, which are looped-back and then return as shown in FIG. 7(b), are transferred to the outer optical add/drop multiplexer 220a, while the optical signals with wavelengths of λ2, λ4, ..., λ2N, which are not affected by the link failure, are directly transferred. Thus, according to the second embodiment of the present invention, the optical signals not affected by the link failure are capable of maintaining a continuity of transmission without any loop-back.

Figure 8A:
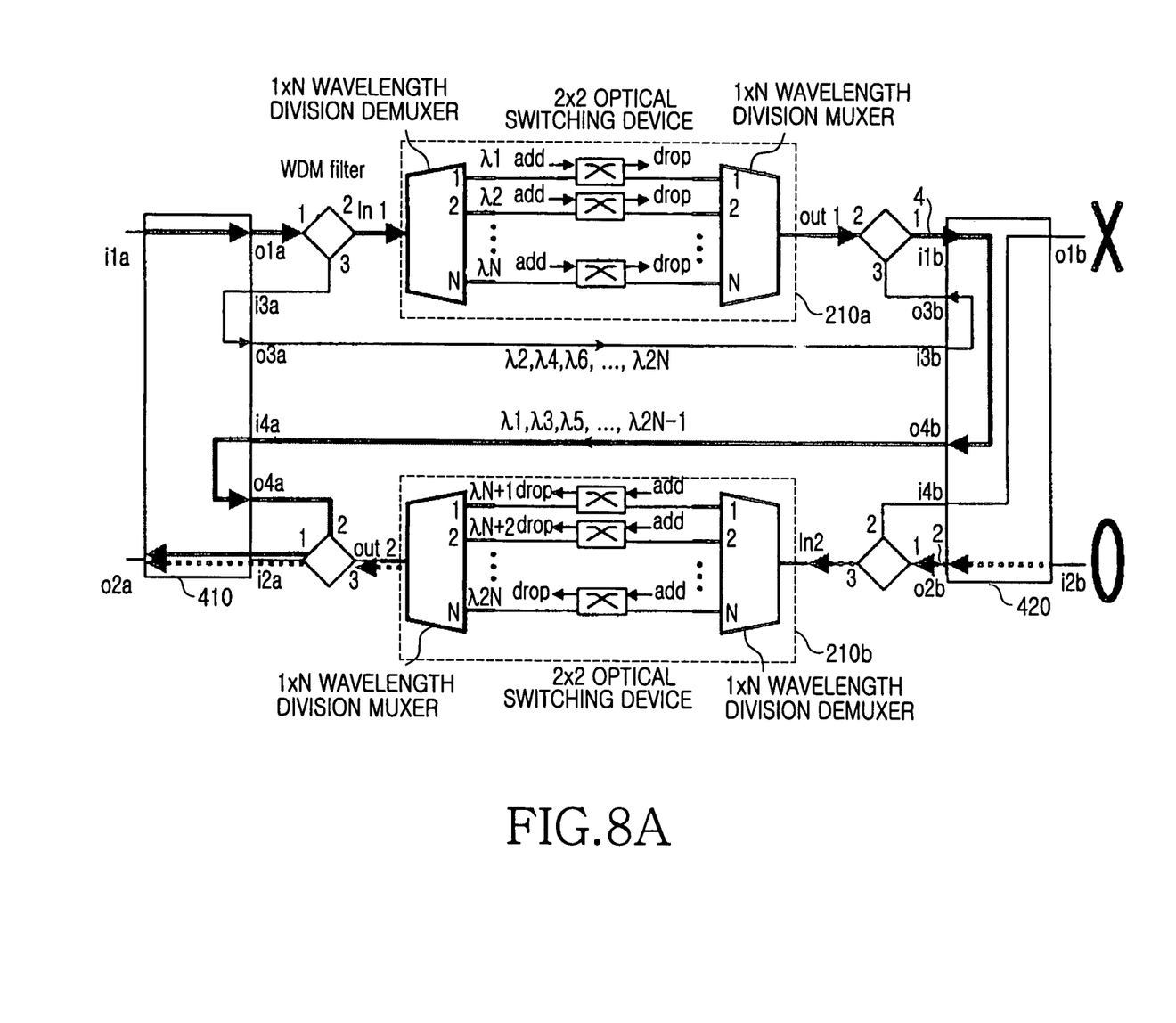
FIG. 8 shows a detailed operation of a node of a bi-directional optical ring network in order to perform a protection switch according to the second embodiment of the present invention.
Figure 8B:
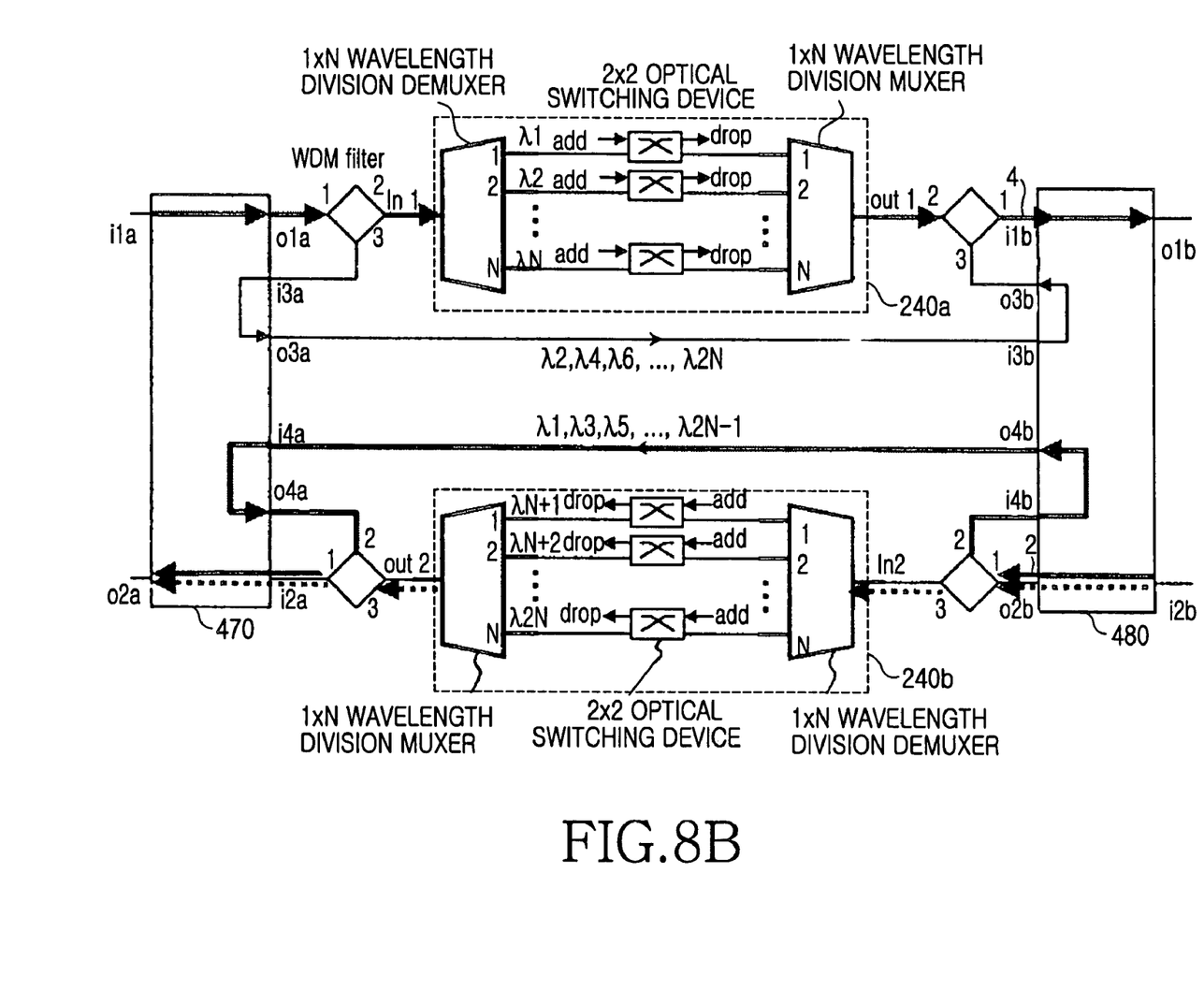
Figure 8C:
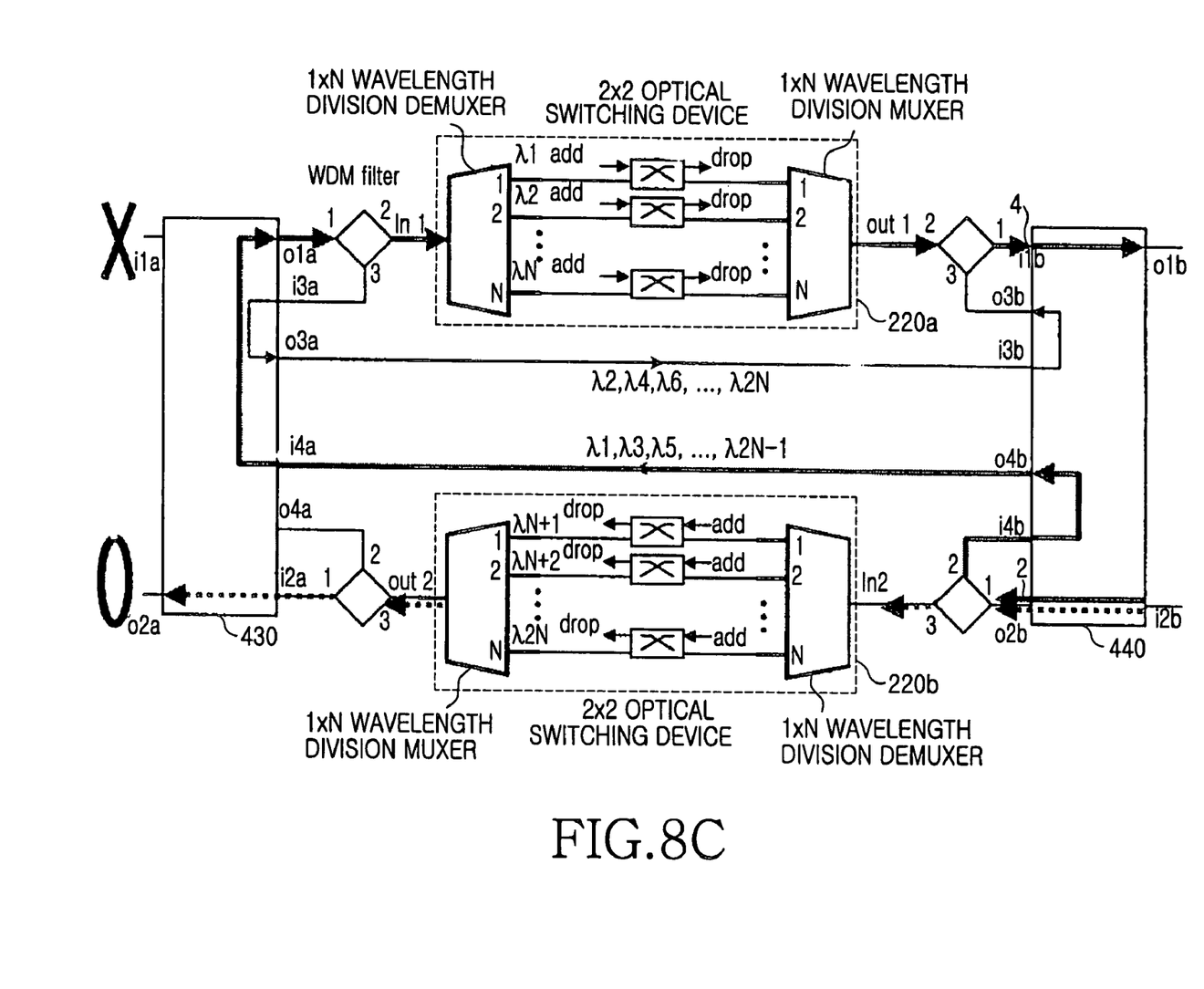

FIG. 8 shows a detailed operation of the node in a bi-directional optical ring network performing a protection switching according to the second embodiment of the present invention. To perform the protection switch, the optical switching devices of each node faces three scenarios, as shown in FIGS. 8(a)-(c).

FIG. 8(a) shows the condition of a left-handed (or counter-clockwise) node adjacent to the link failure. As the optical signals of λ1, λ3, ..., λ2N−1 which must be transmitted in a clockwise direction are unable to transmit due to the link failure, the signals are looped-back from an outer left input port i1b of the optical switching device 420 to a left output port o4b (a thick solid line). As the link failure does not occur, in the counter-clockwise direction, the optical signals of λ2, λ4, ..., λ2N which are transmitted in the counter-clockwise direction maintains a continuity of transmission without any loop-back (a thick dot line). The looped-back optical signals are multiplexed together with the signals which are transmitted in the counter-clockwise direction with the use of the wavelength interleavers, and then transmitted to the neighboring counter-clockwise node. Even though the optical switching devices of FIG. 7 are connected, a thin solid line indicates that no signal is transmitted.

FIG. 8(b) shows another scenario in which a node is not near the failed link. As shown in FIG. 7(b), the signals which are looped-back, but not affected by the link failure, are transmitted to the neighboring node using the wavelength interleavers.

FIG. 8(c) shows yet another scenario in which a node is located on the right (or clockwise) side of the failed link. The optical signals of λ1, λ3, ..., λ2N−1 which are looped back and transmitted in the counterclockwise direction return to the original clockwise direction using the optical switching devices. Here, a right input port i4a of the optical switching device 420 is switched and connected to a right output port o1a (a thick solid line). The inside (or counter-clockwise) signals free from link failure continue to maintain a previous transmission state without any loop-back (a thick dot line).

As explained above, the present invention is designed so that the channel interval of the transmitted optical signals in the bi-directional optical ring network is twice that of the prior art which in turn improves the transmission performance. Additionally, the optical signals passing through the link that does not experience failure can be transmitted normally without any interruption, which has occurred in the prior art, even if the loop-back technique is used to perform the protection switch. Each of the multiplexer and demultiplexer can reduce half the capacity required of the conventional optical add/drop multiplexers. Therefore, it is possible to provide an economical design choice and efficient operation to be implemented in the optical communication network.

While detailed description has been made on the preferred embodiment thereof, it will be understood by those skilled in the art that various changes in form and details may be made as long as they fall to the scope of the invention. Therefore, the invention should not be limited to the preferred embodiment thereof, but be defined by the appended claims as well as by the equivalent to the claims.

What is claimed is:

1. A bi-directional optical ring network having a first ring network and a second ring networks for providing a protection switching, comprising:
   a plurality of nodes, having optical add/drop multiplexers, each being provided on the first and second ring networks and including a demultiplexer and a multiplexer, each of which has a capacity of 1×N;
   a pair of switching devices provided across the first and second ring networks and connected between the optical add/drop multiplexers and fiber optic links connected with another node; and
   wavelength interleavers, each being provided on both ends of each optical add/drop multiplexer provided on the first and second ring networks and including three ports, of which one port is connected to each switching device and allows for passing signals of all wavelength bands, another port allows for passing only signals of some wavelength bands processed on any one of the first and second ring networks, and the third port allows for passing only signals of the other wavelength bands processed on the other,
   wherein the pair of switching devices is configured to loop-back optical signals related to a link failure to one of the first and second ring networks that does not have a link failure when a failure occurs between the nodes via one of the first or second ring networks, and wherein the looped-back optical signals related to the link failure bypass the add/drop multiplexer on said one the first and second ring networks so that each add/drop multiplexer only multiplexes or demultiplexes optical signals which it must add or drop.

2. The optical ring network as claimed in claim 1, wherein when the failure occurs at one fiber optic link of any one of the first and second ring networks, any one of the pair of optical switching devices, which is connected to one end of the fiber optic link at which the failure occurs and is located on a transmitting side in a direction toward which the optical signals proceed, switches inputted optical signals to the other one of the first and second ring networks.

3. The optical ring network as claimed in claim 1, wherein when the failure occurs at one fiber optic link of any one of the first and second ring networks, any one of the pair of optical switching devices, which is connected to one end of the fiber optic link at which the failure occurs and is located on a receiving side in a direction toward which the optical signals proceed, switches inputted optical signals to the other ring network.

4. The optical ring network as claimed in claim 1, wherein the pair of switching devices is further configured to pass through optical signals passing through a first or second ring network if no failure occurs between the nodes.

5. The optical ring network as claimed in claim 1, wherein the pair of switching devices is a 4×4 optical switching device.

6. The optical ring network as claimed in claim 1, wherein the pair of switching devices is a 2×2 optical switching device.

7. A bi-directional optical ring network having first and second ring networks for providing a protection switch, comprising:
a plurality of nodes having optical add/drop multiplexers, each being provided on the first and second ring network and including a demultiplexer and a multiplexer, each of which has a capacity of 1×N;
a pair of switching devices provided across the first and second ring networks and connected between the optical add/drop multiplexers and fiber optic links connected with another node, each switching device having input/output ports for looping back optical signals of wavelength bands processed on any one of the first and second ring networks, and input/output ports for transmitting optical signals of wavelength bands processed on the other ring network; and
wavelength interleavers, each being provided on both ends of each optical add/drop multiplexer provided on the first and second ring networks and including three ports, of which one port is connected to each switching device and allows for passing signals of all wavelength bands, another port allows for passing only signals of some wavelength bands processed on any one of the first and second ring networks, and the third port allows for passing only signals of the other wavelength bands processed on the other, wherein the pair of switching devices is configured to loop-back optical signals related to a link failure to one of the first and second ring networks that does not have a link failure when a failure occurs between the nodes via one of the first or second ring networks, and wherein the looped-back optical signals related to the link failure bypass the add/drop multiplexer on said one the first and second ring networks so that each add/drop multiplexer only multiplexes or demultiplexes optical signals which it must add or drop.

8. The optical ring network as claimed in claim 7, wherein when the failure occurs at one fiber optic link of any one of the first and second ring networks, any one of the pair of optical switching devices, which is connected to one end of the fiber optic link at which the failure occurs and is located on a transmitting side in a direction toward which the optical signals proceed, switches inputted optical signals to the other ring network.

9. The optical ring network as claimed in claim 7, wherein when the failure occurs at one fiber optic link of any one of the first and second ring networks, any one of the pair of optical switching devices, which is connected to one end of the fiber optic link at which the failure occurs and is located on a receiving side in a direction toward which the optical signals proceed, switches inputted optical signals to the other ring network.

* * * * *